(12) United States Patent
Thiel

(10) Patent No.: US 9,919,628 B2
(45) Date of Patent: Mar. 20, 2018

(54) FITTING FOR A VEHICLE SEAT, METHOD FOR ASSEMBLING A FITTING FOR A VEHICLE SEAT, AND VEHICLE SEAT

(71) Applicant: Johnson Controls Components GmbH & Co. KG, Kaiserslautern (DE)

(72) Inventor: Peter Thiel, Remscheid (DE)

(73) Assignee: Johnson Controls Components GmbH & Co. KG, Kaiserslautern (DE)

( * ) Notice: Subject to any disclaimer, the term of this patent is extended or adjusted under 35 U.S.C. 154(b) by 247 days.

(21) Appl. No.: 14/769,962

(22) PCT Filed: Feb. 24, 2014

(86) PCT No.: PCT/EP2014/053536
§ 371 (c)(1),
(2) Date: Aug. 24, 2015

(87) PCT Pub. No.: WO2014/128297
PCT Pub. Date: Aug. 28, 2014

(65) Prior Publication Data
US 2016/0001679 A1      Jan. 7, 2016

(30) Foreign Application Priority Data

Feb. 25, 2013 (DE) .................. 10 2013 003 442
Dec. 16, 2013 (DE) .................. 10 2013 226 002

(51) Int. Cl.
*B60N 2/235* (2006.01)
*B60N 2/20* (2006.01)

(52) U.S. Cl.
CPC ............. *B60N 2/2352* (2013.01); *B60N 2/20* (2013.01); *B60N 2205/20* (2013.01); *B60N 2205/50* (2013.01)

(58) Field of Classification Search
CPC .. B60N 2/20; B60N 2205/50; B60N 2205/20; B60N 2/2352
(Continued)

(56) References Cited

U.S. PATENT DOCUMENTS 6,799,806 B2    10/2004   Eppert et al.
7,497,520 B2 *   3/2009   Assmann ............. B60N 2/2252
                                                        297/362
(Continued)

FOREIGN PATENT DOCUMENTS

DE       44 36 111 C1    1/1996
DE      195 48 809 C1    5/1997
(Continued)

*Primary Examiner* — Milton Nelson, Jr.
(74) *Attorney, Agent, or Firm* — McGlew and Tuttle, P.C.

(57) ABSTRACT

A motor vehicle seat fitting (10) includes a first fitting part (11) and a relatively rotatable second fitting part (12), which are connected to each other via a gear unit or can be locked. A third fitting part (74) is mounted on a bearing ring (71) in a pivotal manner about an axis (A) relative to the first fitting part. The bearing ring is fixed to the first fitting part. The third fitting part (74) can be locked with the first fitting part or a component rigidly connected thereto. A pawl (80) is mounted on the third fitting part in a first hinge point (D1). The bearing ring (71) has multiple run-on cams (71a) which interact with multiple elevations (74a) of the third fitting part. A free clearance, in the radial direction between the bearing ring (71) and the third fitting part, is minimized when the pawl (80) is locked.

20 Claims, 13 Drawing Sheets

(58) Field of Classification Search
USPC .......................................... 297/366; 29/428
See application file for complete search history.

(56) References Cited

U.S. PATENT DOCUMENTS

| | | |
|---|---|---|
| 7,571,962 B2 | 8/2009 | Thiel et al. |
| 2010/0141007 A1* | 6/2010 | Kienke ................ B60N 2/206 |
| | | 297/367 R |

FOREIGN PATENT DOCUMENTS

| | | |
|---|---|---|
| DE | 100 41 604 A1 | 3/2002 |
| DE | 100 41 604 B4 | 11/2007 |
| DE | 10 2008 024 853 A1 | 11/2009 |
| DE | 10 2008 026 176 A1 | 12/2009 |

* cited by examiner

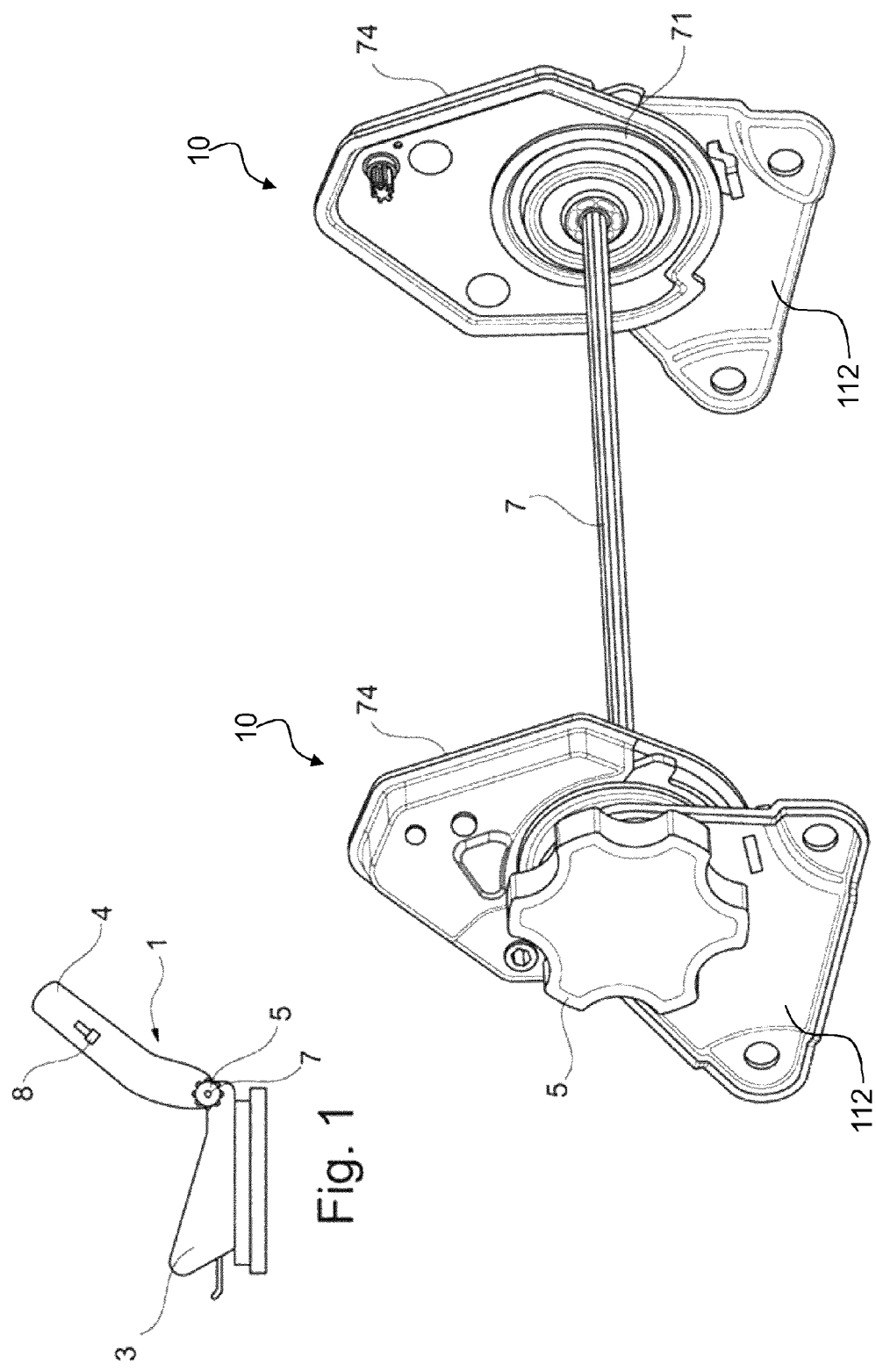

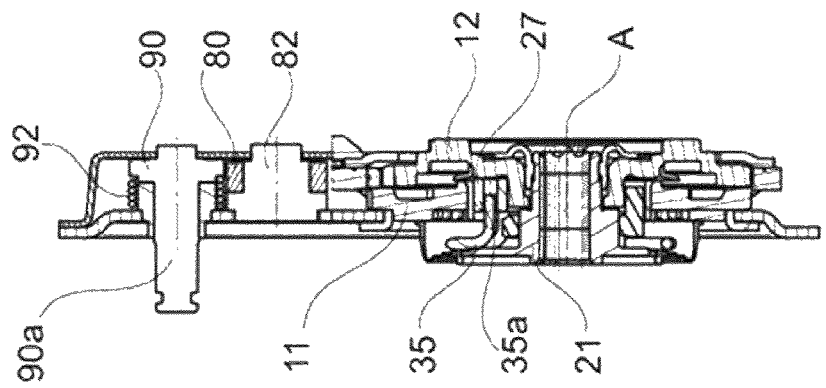
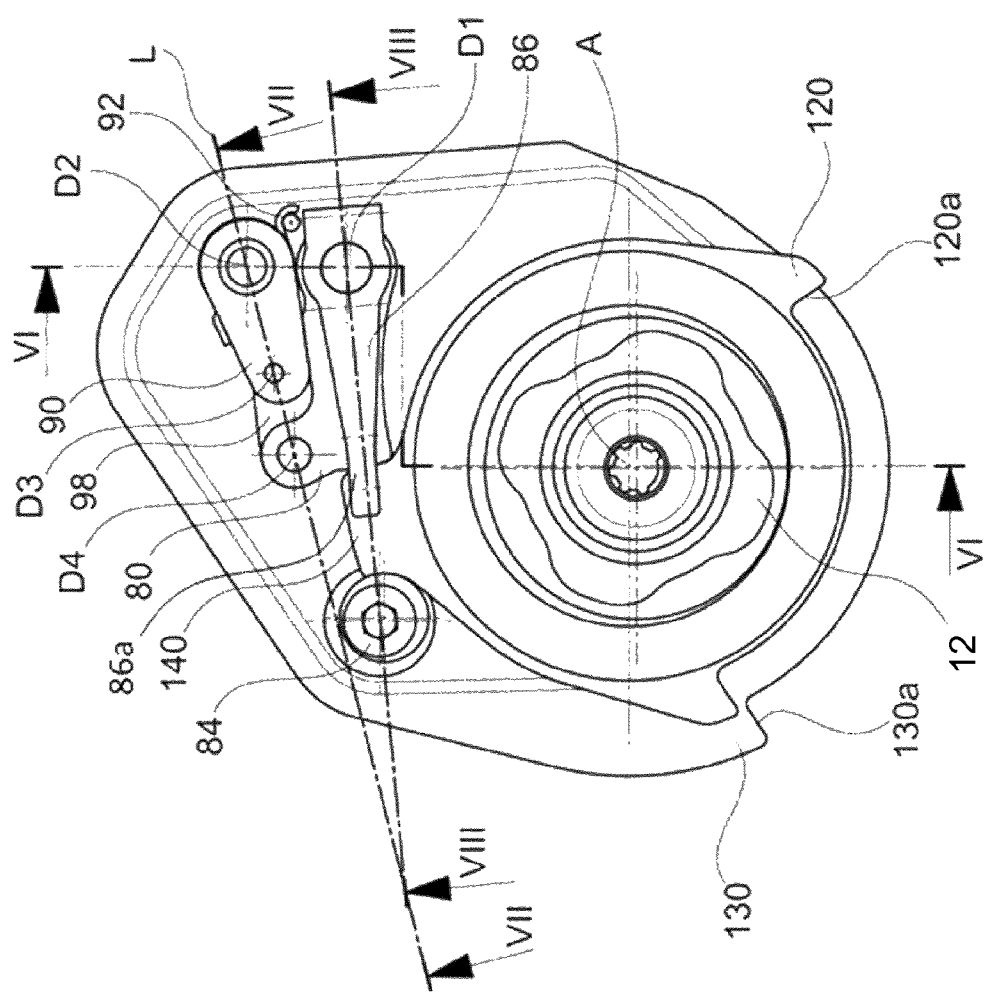
Fig. 6
Fig. 5

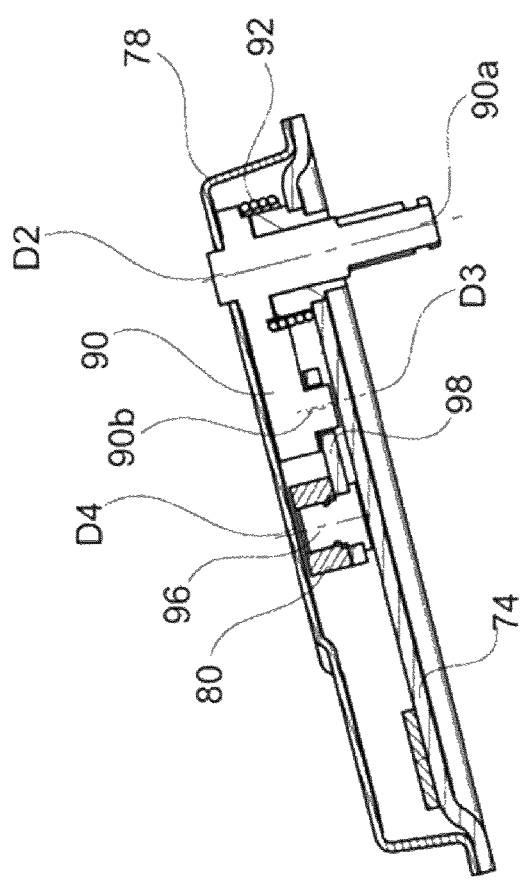
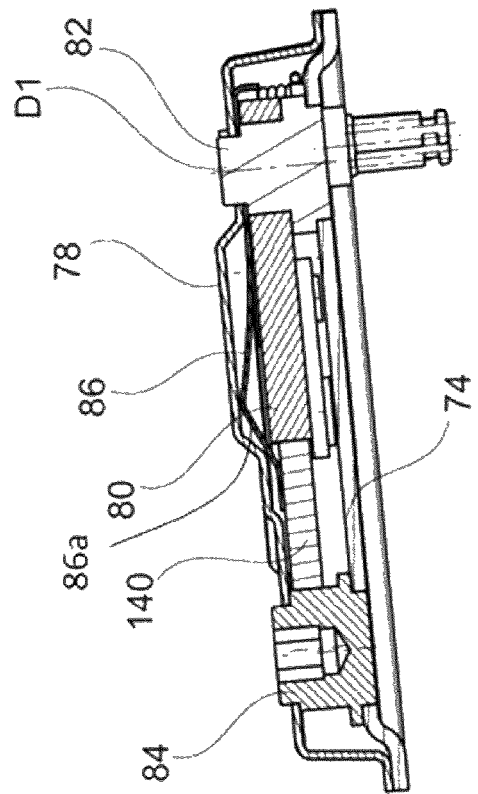

FITTING FOR A VEHICLE SEAT, METHOD FOR ASSEMBLING A FITTING FOR A VEHICLE SEAT, AND VEHICLE SEAT

CROSS REFERENCE TO RELATED APPLICATIONS

This application is a United States National Phase Application of International Application PCT/EP2014/053536 filed Feb. 24, 2014 and claims the benefit of priority under 35 U.S.C. § 119 of German Patent Applications 10 2013 003 442.6 filed Feb. 25, 2013 and 10 2013 226 002.4 filed Dec. 16, 2013 the entire contents of which are incorporated herein by reference.

FIELD OF THE INVENTION

The invention relates to a fitting for a vehicle seat, in particular for a motor vehicle seat, having a first fitting part and a second fitting part which are rotatable relative to one another and are in geared connection with one another, or are lockable with one another, and a third fitting part which is mounted on a bearing ring, which is fastened on the first fitting part, so as to be pivotable about an axis relative to the first fitting part, wherein the third fitting part is lockable with the first fitting part, or with a component which is fixedly connected to the first fitting part and to a method for assembling a fitting for a vehicle seat and to a vehicle seat.

BACKGROUND OF THE INVENTION

A fitting of this type is known from U.S. Pat. No. 7,571,962 B2. The first fitting part and the second fitting part are in geared connection with one another in order to adjust the inclination of the backrest inside a comfort adjustment range. The third fitting part is pivotably mounted on a bearing ring which is fastened on the first fitting part. In addition, a separately realized latching element rests on the bearing ring and is fastened on said bearing ring such that it is fixedly connected to the first fitting part. A toothed pawl, which is pivotably mounted on the third fitting part, locks with the latching element which is also toothed for this purpose in a radially protruding region. If the pawl is opened, the backrest is freely pivotable. The free pivoting serves in particular to facilitate the access of passengers to a rear row of seats and consequently supplements the comfort adjustment range in a useful manner. The third fitting part rests on the bearing ring with a small amount of play. The seat user clearly notices said play on the top edge of the backrest, which reduces the subjective quality perception.

DE 100 41 604 B4 makes known a generic fitting having a bearing bush and a third fitting part which is mounted on said bearing bush. During the assembly of the fitting, as a result of rotating the bearing bush relative to the third fitting prior to fastening the bearing bush on a first fitting part, a play present in the bearing position and in the locking is adjusted in a defined manner. To this end, a total of three elevations are provided on the bearing surface of the bearing bush and three elevations on an inside surface of an opening of the third fitting part which is mounted on the bearing bush, which, with a free pivoting function in a locked state, abut against one another extensively such that any play present is extensively eliminated. When the backrest pivots freely, that means when the third fitting part is pivoted relative to the bearing bush, a play necessary for free pivoting is generated as the elevations no longer contact each other as a result of the inside surface of the opening being rotated relative to the bearing bush. In order to be able to adjust the play in a precise manner, an assembly position is chosen in which the third fitting part and the first fitting part are coupled together by means of a pawl. The bearing bush is then rotated until the elevations of the bearing bushes contact the elevations on the inside surface of the opening of the third fitting part. The bearing bush is then rotated again anticlockwise by 1.3 degrees and then welded on the first fitting part. Rotating the bearing bush anticlockwise avoids clamping in the bearing position or the locking, however, as a result it is not possible to minimize or even eliminate the play present completely.

SUMMARY OF THE INVENTION

An object underlying the invention is to improve a fitting of the type mentioned in the introduction, in particular to provide an optimized play-free position in the bearing position of the third fitting part by dispensing with the counterclockwise rotation of the bearing bush during the assembly of the fitting. In addition, an object underlying the invention is to provide a method for the assembly of such a fitting and to provide a vehicle seat with a corresponding fitting.

Said object is achieved by a fitting having a first fitting part and a second fitting part, which are rotatable relative to one another and are in geared connection with one another or are lockable with one another, and a third fitting part which is mounted on a bearing ring, which is fastened on the first fitting part, so as to be pivotable about an axis relative to the first fitting part, wherein the third fitting part is lockable with the first fitting part, or with a component which is fixedly connected to the first fitting part, by means of pawl which is mounted in a first pivot point on the third fitting part. It is provided, according to the invention, that the bearing ring comprises several run-up cams which interact with several elevations of the third fitting part in such a manner that, with the pawl locked, free play in the radial direction between the bearing ring and the third fitting part is minimized.

The state "with the pawl locked" means that the third fitting part is secured by means of the pawl against a relative rotation relative to the first fitting part.

As a result of the bearing ring comprising several run-up cams which interact with several elevations of the third fitting part in such a manner that when the pawl is locked, free play in the radial direction between the bearing ring and the third fitting part is minimized, in particular is eliminated, an optimized play-free position is provided in the bearing position of the third fitting part. It is surprising to the experts that the bearing ring is able to be fastened on the first fitting part in a relative position to the third fitting part which corresponds to minimized play. Prior to its fastening on the first fitting part, the bearing ring does not have to be rotated counterclockwise relative to said position as described as necessary in DE 100 41 604 B4.

The pawl can lock directly with a contour of the first fitting part. However, it is also possible for the pawl to interact in a locking manner with a contour of a component which is fixedly connected to the first fitting part.

The first and the second fitting part and the component parts received between said fitting parts can form a gear fitting which is known per se and is also designated as a tumble fitting. The free pivoting device of the fitting according to the invention, which is formed in particular by the bearing ring, the third fitting part and the pawl, can be fastened in a modular manner on such a gear fitting.

The first and the second fitting part and the component parts received between said fitting parts can form a latching fitting which is known per se. The free pivoting device of the fitting according to the invention, which is formed in particular by the bearing ring, the third fitting part and the pawl, can be fastened in a modular manner on such a latching fitting. A fitting system with memorization of the backrest inclination and an additional free pivoting device on one of two latching fittings is known, for example, from DE 10 2008 026 176 A1.

By the bearing ring comprising precisely three run-up cams and the third fitting part comprising precisely three elevations, a structurally determined system can be provided for the play-free position in the manner of a tripod.

The three run-up cams of the bearing ring preferably point radially outward proceeding from a radially outwardly pointing bearing surface. The three run-up cams preferably point in the direction of the third fitting part, in particular in the direction of a delimiting surface of an opening in the third fitting part. The three elevations of the third fitting part preferably point radially inward in the direction of the bearing ring. The three elevations of the third fitting part preferably point radially inward in the direction of the bearing ring proceeding from a delimiting surface of an opening in the third fitting part.

An eccentric bolt, which, with the pawl in the locked state, abuts in a play free manner against a projection of the first fitting part or against a component which is fastened to the first fitting part, is fastened on the third fitting part. The eccentric bolt preferably includes a first bolt portion which extends in the axial direction and is inserted into an opening of the third fitting part, and a second bolt portion which extends in the axial direction but is offset in parallel and, with the pawl in the locked state, abuts in a play-free manner against the first fitting part. The first bolt portion and the second bold portion are arranged, as a result, offset with respect to one another about a first eccentricity in the radial direction. As a result, during the assembly process play between the eccentric bolt, which serves at least as a stop in the event of a crash, and the projection of the first fitting part can be eliminated.

With the pawl in the locked state, the pawl and the eccentric bolt receive the projection of the first fitting part preferably between them.

A bearing bolt, which forms the first pivot point for the bearing arrangement of the pawl, is fastened additionally on the third fitting part. The bearing bolt can be realized in a rotationally symmetrical manner without eccentricity. In a preferred realization, however, the bearing bolt includes a first bearing bolt portion which extends in the axial direction and is inserted into an opening of the third fitting part, and a second bearing bolt portion which extends in the axial direction and bears the pawl. The first bearing bolt portion and the second bearing bolt portion are, as a result, arranged offset with respect to one another in the radial direction about a second eccentricity. As a result the pawl can be set in a play-free manner.

The locking of the free pivoting device, that means the securing of the pawl in its locking position, can be achieved in a particularly secure manner as a result of the third fitting part, a blocking cam which is mounted in a second pivot point on the third fitting part, a coupler which is pivotably connected to the blocking cam in a third pivot point and to the pawl in a fourth pivot point and the pawl defining a four-pivot chain (linkage). The gear members of the four-pivot chain do not have to be connected together by means of pure rotary joints. In a preferred manner, one of the pivot points of the four-pivot chain is realized as a turn-slide joint and the remaining pivot joints as pure rotary joints. As a result, the pawl can be locked beyond the dead center position. It is particularly efficient when the second pivot point is realized as a turn-slide joint and the remaining pivot points are realized as rotary joints.

A play in the four-pivot chain, which is present inevitably on account of the turn-slide joint, has no negative effects on the zero play of the locking in the normal operation of the seat when a spring prestresses the four-pivot chain, in particular the blocking cam, in the direction of the locked position of the pawl and pivots the blocking cam to abut against the pawl. A locking cam of the pawl, which is designed as a clamping surface, preferably within the self-locking system, is, as a result, clamped against the locking surface of the first fitting part without the turn-slide joint having to be set in a play-free manner as a result of a maximum deflection in the translation direction.

The dead center position can be generated in a particularly simple manner by, with the pawl in the locked state, the third pivot point lying on an imaginary connecting line between the second pivot point and the fourth pivot point or the third pivot point lying between the connecting line and the pawl.

The object is additionally achieved by a method for assembling a fitting as claimed in the invention, which includes the at least three following named method steps. Firstly pre-positioning the first fitting part, the third fitting part and the bearing ring into a relative position with respect to one another, which at least approximately corresponds to a locked position of the pawl. Secondly rotating the bearing ring relative to the third fitting part until the run-up cams and the elevations abut against one another in a play-free manner, and then thirdly fixing the bearing ring on the first fitting part. The fixing of the bearing ring on the first fitting part is preferably effected by means of laser welding.

In an optional further method step, an eccentric bolt can be rotated until the eccentric bolt abuts in a play-free manner against a projection of the first fitting part or of a further component which is connected to the first fitting part and the eccentric bolt is then fixed in said position on the third fitting part. A component which is realized separately first of all has advantages compared to a projection which is incorporated into the first fitting part when the first fitting part is also to be used for fittings without a free pivoting device, that means is a component part of a construction kit.

The pawl can be adjusted in a play-free manner by, in an optional further method step, the first pivot point being formed by a bearing bolt and the bearing bolt including a first bearing bolt portion which extends in the axial direction and is inserted into an opening of the third fitting part, and a second bearing bolt portion, which extends parallel to the axis, for the bearing arrangement of the pawl, and the bearing bolt being rotated until the pawl abuts in a play-free manner against a projection, in particular the projection of the first fitting part, and the bearing bolt then being fixed in said position on the third fitting part.

The object is additionally achieved by a vehicle seat having a seat part and a backrest which are connected together by means of a fitting according to the invention. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic representation of a vehicle seat;

FIG. 2 is a perspective view of two fittings according to a first exemplary embodiment;

FIG. 5 is a top view of the fitting of the first exemplary embodiment;

FIG. 6 is a sectional view through the fitting along the line VI-VI in FIG. 5;

FIG. 7 is a sectional view through the fitting along the line VII-VII in FIG. 5;

FIG. 8 is a sectional view through the fitting along the line VIII-VIII in FIG. 5;

DESCRIPTION OF THE PREFERRED EMBODIMENTS

Figure 3:
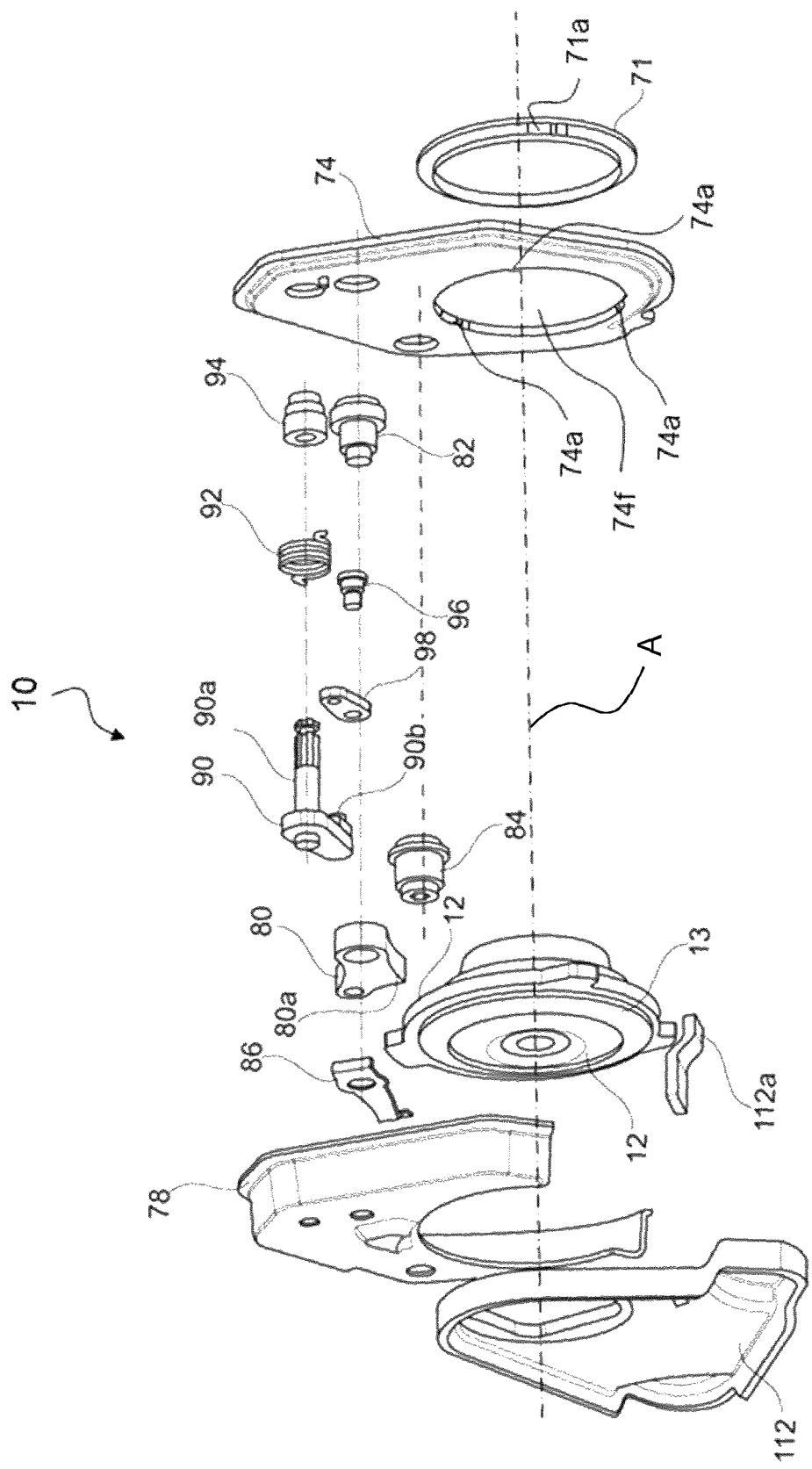
FIG. 3 is a schematic exploded drawing of one of the fittings from FIG. 2 including an adapter.

A vehicle seat 1 for a motor vehicle comprises a seat part 3 and a backrest 4, the inclination of which is adjustable relative to the seat part 3. For adjusting the inclination of the backrest 4, a drive shaft 7, which is arranged horizontally in the transition region between the seat part 3 and the backrest 4, is rotated manually, for example by means of a hand wheel 5, or by motor, for example by means of an electric motor. The drive shaft 7 engages non-rotatably in each case into a fitting 10 on both sides of the vehicle seat 1. The drive shaft 7 defines the directional specifications of a cylindrical coordinate system that are used.

The fitting 10 includes a first fitting part 11, a second fitting part 12 and a free pivoting device with a third fitting part 74. First of all, the design and the method of operation of the first fitting part 11 and of the second fitting part 12 with the free pivoting device in a locked state is described.

The two fitting parts 11 and 12 are rotatable relative to one another and can be inscribed in each case approximately into a circular disk form. Individual functional geometries, which are described again below, protrude in the radial direction above the circular basic geometry of the first fitting part 11. A clamping ring 13 is provided for receiving the axially acting forces, that is for holding the fitting parts 11 and 12 together. Such cohesion by means of a clamping ring is described, for example, in U.S. Pat. No. 6,799,806 A. The preferably metal clamping ring 13 is connected fixedly to one of the two fitting parts 11 and 12, in the present case to the first fitting part 11 in an outer edge portion, for example welded or flanged (at least in part in the circumferential direction).

By means of an edge which points radially inward, the clamping ring 13, where applicable so as to interpose a separate sliding ring, engages over the other of the two fitting parts 11 and 12, which is movable relative to it, radially on the outside without obstructing the relative rotation of the two fitting parts 11 and 12, i.e. the clamping ring 13 and the fitting part 11 or 12 which is fixedly connected to it clamp onto the other of the two fitting parts 11 and 12 which is movable relative to them. In a structural respect, the two fitting parts 11 and 12 consequently together with the clamping ring 13 and further gear components which are received in a space between the fitting parts 11 and 12 form a disk-shaped unit which forms a unit for adjusting the backrest inclination within a comfort adjustment range, said unit being operational in a manner known per se and also without an additional free pivoting device. The fitting 10 is consequently constructed in a modular manner by an additional free pivoting device being adapted to a fitting which is known per se.

Once the fitting 10 has been fastened onto the vehicle seat 1, the first fitting part 11 is in (locked) connection with the backrest 4 as long as the free pivoting device, which is described in more detail below, is not unlocked. The second fitting part 12 is connected fixedly to the structure of the seat part 3 by means of an adapter 112, that is it is fixed to the seat part. However, the assignments of the fitting parts 11 and 12 can also be swapped over, i.e. the first fitting part 11 would then be fixed to the seat part and the second fitting part 12 would be connected to the backrest 4. The fitting 10 lies in the force flow between the backrest 4 and the seat part 3, which is why the two fitting parts 11 and 12 are produced from metal, preferably steel.

In the first exemplary embodiment shown in FIGS. 1 to 21, the fitting 10 includes a gear fitting where the first fitting part 11 and the second fitting part 12 are connected together by means of a gear system for the adjusting and securing, more precisely by means of an eccentric epicyclic gear system in the present case self-locking, as is described for example in DE 44 36 111 A1. The present invention, however, is not restricted to gear fittings, but can also be combined as shown in FIG. 22 with latching fittings that are known per se, the principle of operation of which with regard to locking between a first fitting part and a second fitting part is known, for example, from DE 10 2008 024 853 A1.

For realizing the gear, an externally toothed gear wheel 16 is realized on the second fitting part 12 and an internally toothed sprocket 17 is realized on the first fitting part 11, both of which mesh with one another. The diameter of the tip circle of the external toothing of the gear wheel 16 is smaller than the diameter of the root circle of the internal toothing of the sprocket 17 by at least one tooth height. A corresponding difference in the number of teeth between the toothed wheel 16 and the sprocket 17 of at least one tooth enables a rolling motion of the sprocket 17 on the toothed wheel 16. As a result of said rolling motion, the first fitting part 11 and the second fitting part 12 are rotated relative to one another and, as a result, the inclination of the backrest 4 relative to the seat part 3 is changed. The passenger on the vehicle seat 1 is consequently able to adapt the backrest inclination to his individual comfort requirements.

The comfort adjustment range of the backrest is delimited by a stop 112a, which is connected fixedly to the adapter 112, which is fixed to the seat part, engaging between a first cam 120 and a second cam 130 of the first fitting part 11. The first cam 120 and the second cam protrude as functional geometries above the circular basic geometry of the first fitting part 11 in the radial direction. A first stop surface 120a which faces the stop 112a is realized on the first cam 120 and a second stop surface 130a which faces the stop 112a is realized on the second cam 130, one of which in each case abuts against the stop 112a in one of the two end points of the comfort adjustment range of the backrest and prevents further adjustment of the fitting 10. The distance between the first stop surface 120a and the second stop surface 130a is greater than the dimension of the stop 112a that is located between them, as a result of which the comfort adjustment range of the backrest is defined.

The toothed wheel 16 and the sprocket 17 are preferably realized by means of one single embossing-punching operation which at the same time punches out the fitting parts 11 and 12 from their starting material. As an alternative to this, the fitting parts 11 and 12 with similar geometries and identical functions can be produced as a result of mass forming (preferably cold extrusion or hot extrusion). In the present case, the toothed wheel 16 forms the radially outer edge of the second fitting part 12, i.e. the second fitting part 12 closes off with the toothed wheel 16 radially on the outside.

The second fitting part 12 comprises a collar 19 concentrically with respect to the toothed wheel 16. The collar 19 can be integrally molded on the said fitting part (i.e. realized in one piece) as a collared groove or can be fastened thereon as a separate sleeve. An entrainment means 21 is rotatably mounted in the collar 19 by means of a hub 22. The entrainment means 21 preferably consists of plastics material. The hub 22 of the entrainment means 21 is provided centrally with a bore 23 for receiving the drive shaft 7. The profile of the bore 23 is realized so as to match the profile of the drive shaft 7, in the present case a spline shaft profile. Connecting to its hub 22, the entrainment means 21 comprises a cover disk 25, which is realized integrally with the hub 22 and has a larger diameter than the hub 22.

Two wedge segments 27, which by way of their curved outside surfaces—mount the first fitting part 11, are supported by way of their curved inside surfaces—on the collar 19. To this end, a receiving means of the last-mentioned fitting part is lined with a plain bearing bush 28 which is preferably pressed in so as to be non-rotatable and against which the outside surfaces of the wedge segments 27 abut. The terms "support" "mount" are not to be restricted to a certain direction of the force flow through the fitting 10 as said direction depends on the assembly of the fitting 10.

The entrainment means 21 comprises at a radial spacing to the hub 22 an entrainment segment 29 which bites with play between the narrow sides of the wedge segments 27 and is realized in one piece with the cover disk 25 and with the hub 22. The wedge segments 27, the wide sides of which face one another, receive in each case an angled end finger 35a of an omega-shaped spring 35, for example with one opening each or with a recess which is defined by projecting material parts. The spring 35 acts upon the wedge segments 27 in the circumferential direction, in particular in order to press them apart, it being possible for the wide sides of the wedge segments 27 to contact one another and act upon one another in operation.

The entrainment means 21 is axially secured on the outside surface of the fitting part comprising the collar 19 by a preferably clipped-on locking ring 43. The locking ring 43 extends in the axial direction along part of the hub 22 such that the hub 22 does not abut directly against the inside surface of the collar 19, but is mounted in the collar 19 so as to interpose the locking ring 43 (and as a result the entrainment means 21 is mounted on the second fitting part 12). A sealing ring 44, for example produced from rubber or soft plastics material, which is connected, in particular clipped, to the cover disk 25, is provided on the outside surface of the fitting part comprising the plain bearing bush 28 (in the present case the first fitting part 11) between its radially outer edge and the cover disk 25.

An eccentric, which presses the toothed wheel 16 into the sprocket 17 at an engagement point in the extension of the direction of the eccentricity, is defined by the wedge segments 27 (and the spring 35). In the case of a drive where the drive shaft 17 rotates (several times), a torque is initially transmitted onto the entrainment means 21 and by means of the entrainment segment 29 then onto the eccentric which slides along the plain bearing bush 28 so as to displace the direction of the eccentricity and consequently so as to displace the engagement point of the toothed wheel 16 in the sprocket 17, which is provided as a tumbling rolling motion, i.e. as a relative rotation with superimposed tumbling movement. The inclination of the backrest 4 is steplessly adjustable as a result between several operating positions.

For improving the dynamic operating behavior, a locking spring 51 is preferably provided as another blocking element, as is disclosed, for example, in DE 195 48 809 C1. The locking spring 51 interacts in the present case with a toothing 55 which is realized as a further sprocket on the first fitting part 11. The locking spring 51 locks in each case the wedge segments 27 in the non-driven state (by the locking spring 51 blocking the spring 35 by means of abutment against the end fingers 35a) and is released by the driven entrainment means 21.

Apart from the said disk-shaped unit which is realized as a gear fitting with the components contained therein, each fitting 10 also includes a free pivoting device. A third fitting part 74 is mounted on the first fitting part 11, on its side remote from the second fitting part 12, by means of a bearing ring 71 which is fastened on the first fitting part 11. The substantially plate-shaped third fitting part 74 is connected to the backrest structure of the backrest 4 and is pivotable relative to the first pivoting part 11 about a central axis A (defined by the bearing ring 71), which lies parallel to the transmission rod 7, for the free pivoting which occurs centrally. In so far as not described otherwise, all the rotations described below extend about rotational axes which are aligned parallel to the axis A. The axis A also defines the terms—"axially" and "radially"—that are used.

A circumferential bearing surface 71*f* of the bearing ring 71 comprises three radially outwardly directed run-up cams 71*a* which are distributed evenly over the circumference. The run-up cams 71*a* interrupt the otherwise circular-cylindrical, radially outwardly pointing bearing surface 71*f* of the bearing ring 71. Each of the three run-up cams 71*a* preferably has the identical geometric contour such that only one run-up cam 71*a* is described below.

Proceeding from the circular-cylindrical basic contour of the bearing surface 71*f* of the bearing ring 71, the run-up cam 71*a* constantly increases radially outwardly in the circumferential direction initially at a flat angle, in the present case over a range of approximately 10° to 15°, such that a first run-up surface 71*b* is formed. Over a connecting range of approximately 3° to 10° in the circumferential direction, the contour of the run-up cam 71*a* constantly extends in a decreasing manner and merges into the circular basic contour of the bearing surface 71*f* of the bearing ring 71 again. The three run-up cams 71*a* are offset with respect to one another in the circumferential direction preferably in each case by precisely 120°.

The third fitting part 74 comprises an opening 74*f* which, with the exception of the deviations described below, is circular and forms per se the circular-cylindrical bearing surface 71*f*. For interacting with the run-up cams 71*a*, the opening 71*f* comprises three elevations 74*a*. Each of the three elevations 74*a* preferably has the identical geometric contour such that only one elevation 74*a* is described below.

Proceeding from the circular-cylindrical basic contour of the opening 74*f* which provides a delimitation of the opening 74*f*, the elevation 74*a* constantly increases radially inwardly in the circumferential direction of the opening 74*f* initially at a flat angle, in the present case over a range of approximately 10° to 15° such that a second run-up surface 74*b* of the elevation 74*a* is formed. Over a connecting range of approximately 3° to 10° in the circumferential direction, the contour of the elevation 74*a* constantly extends in a decreasing manner back into the circular basic contour of the opening 74*f* of the third fitting part 74. The three elevations are offset with respect to one another in the circumferential direction preferably in each case by precisely 120°.

When the vehicle seat 1 is in use, the third fitting part 74 is locked with the first fitting part 11. In said relative position between the bearing ring 71 and the third fitting part 74, a run-up surface 71*b* of a run-up cam 71*a* and a run-up surface 74*b* of an elevation 74*a* are in each case in non-self-locking contact with one another. As a result, the play in the bearing position between the bearing ring 71 and the third fitting part 74 is exposed.

When the unlocked third fitting part 74 and consequently the backrest 4 is pivoted forward, the contact described beforehand between the run-up surfaces 71*b* of the run-up cams 71*a* and the run-up surfaces 74*b* of the elevations 74*a* is released from one another and the bearing position has play which is advantageous for a relative movement between the bearing ring 71 and the third fitting part 74.

For locking the third fitting part 74 with the first fitting part 11, the first fitting part 11 comprises as further functional geometry a projection 140 which protrudes in the radial direction above the circular basic geometry of the first fitting part 11 and interacts with a pawl 80 which is rotatably mounted by means of a bearing bolt 82 on the third fitting part 74 on the side facing the first fitting part 11. The bearing bolt 82 comprises individual portions which are either in each case extensively rotationally symmetrical with respect to, in each case, an axis which is parallel to the axis A, or, as described in more detail below, can be located eccentrically with respect to one another.

The pawl 80 has a basic geometry which is similar to an L-shape with a long leg and a short leg. A circular hole in the end region of the long leg remote from the short leg serves for receiving the bearing bolt 82 and together with said bearing bolt forms the bearing position of the pawl 80 in a first pivot point D1 on the third fitting part 74. A locking cam 80*a* is formed in the connecting region between the long leg and the short leg of the pawl 80 for interacting with a locking surface 140*b* of the projection 140. In order to lock the third fitting part 74 with the first locking part 11, the locking cam 80*a* is supported in the free pivoting direction on the locking surface 140*b* of the projection 140.

An eccentric bolt 84, serving as a stop, on the third fitting part 74 serves for delimiting the pivoting movement of the third fitting part 74 in the backward pivoting direction of the backrest 2 (anticlockwise in FIGS. 5, 9, 10, 11, 12, 13, 14, 15, 16, 17 and 21) by the eccentric bolt 84 running up against a support surface 140*a* of the projection 140 when the operating position of the backrest 4 is reached again once the free pivoting has finished. In said position, the run-up surfaces 71*b*, 74*b* also abut against one another in each case. The eccentric bolt 84 comprises individual portions which are in each case extensively rotationally symmetrical with respect to, in each case, an axis which is parallel to the axis A. To compensate for production tolerances, the eccentric bolt 84 is formed in a stepped manner in its axial direction with extensively cylindrical disks which are eccentric to one another. A first bolt portion 84*a* of the eccentric bolt 84, which is inserted into a circular hole of the third fitting part 74 and is formed in a circular-cylindrical manner, is arranged offset in the radial direction about a first eccentricity E1 with respect to a circularly-cylindrically formed second bolt portion 84*b* of the eccentric bolt 84, the second bolt portion 84*b* moving into abutment with the support surface 140*a* when the operating position is regained. A profile 84*c*, for example a hexagon socket or another inner profile in the eccentric bolt 84 serves at the same time as an interface to a twisting tool with a complementary geometry, for example a hexagon key.

A blocking cam 90 is mounted so as to be rotatable on the third fitting part 74 in a second pivot point D2, which is at a spacing from the first pivot point D1, on the side facing the first fitting part 11. To this end, the blocking cam 90 comprises on one end a stub shaft 90*a* which projects perpendicularly from the blocking cam 90, extends parallel to the axis A and is inserted into an opening of the third fitting part 74 by means of a bush 94. The free end of the stub shaft 90*a* projects through the third fitting part 74 and protrudes on the side remote from the first fitting part 11 above the substantially plate-shaped basic geometry of the third fitting part 74. The free end of the stub shaft 90*a* is profiled, in particular is realized in a polygonal manner. A component which is with a corresponding counter profile can be slipped on in the axial direction such that a non-rotatable connection between the stub shaft 90*a* and the slipped-on component is provided. The slipped-on component in the present case is a lever which is not shown in the Figures and is operatively connected by means of a cable pull to a manual lever 8 which is fastened in the upper region of the backrest 4. Actuating the manual lever 8 rotates the stub shaft 90a and consequently the blocking cam about the second pivot point D2.

A coupler 98 with an even, elongated basic form is connected by way of a first end in a third pivot point D3 to the end of the blocking cam 90 remote from the stub shaft 90. The second end of the coupler 98 is connected in a fourth pivot point D4 to the short leg of the pawl 80.

The third pivot point D3 is formed by a cylindrical journal 90b which protrudes on the end of the blocking cam 90 remote from the stub shaft 90a parallel to the axis A and engages in an elongated hole of the first end of the coupler 98. On account of the pairing of the cylindrical journal 90b with the elongated hole of the coupler 98, the third pivot point D3 is realized as a turn-slide joint and thus enables, along with a pure rotational movement, also a translation which is defined by the elongated hole geometry between the coupler 98 and the blocking cam 90.

The fourth pivot point D4 is formed by a rivet 96 which is pushed through a circular hole of the second end of the coupler 98 and a circular hole in the end region of the short leg of the pawl 80 and is riveted in such a manner that a pure rotational joint is generated.

The pawl 80 which is mounted in the first pivot point D1 on the third fitting part 74, the blocking cam 90 which is mounted in the second pivot point D2 on the third fitting part 74 and the coupler 98 which is flexibly connected in the third pivot point D3 to the blocking cam 90 and in the fourth pivot point D4 to the pawl 80 define an extensively even four-pivot chain (which is pivoted on the third fitting part 74) which serves for unlocking and locking the free pivoting function.

A cover 78, which is fastened on the third fitting part 74, covers the aforementioned individual parts of the free pivoting device at least in part and protects the same from contamination. The bearing bolt 82, the blocking cam 90 and the eccentric bolt 84 are supported or mounted, in addition to their bearing arrangement in the holes of the third fitting part 74, in an oppositely located hole pattern in the cover 78.

Figure 9:
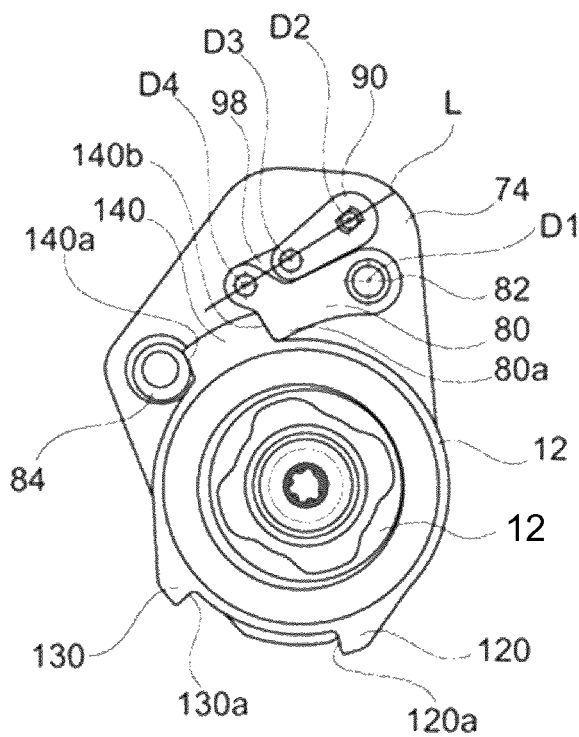
FIG. 9 is a top view of the fitting from FIG. 5 with the free pivoting device in the locked state without a cover and without a retention spring.

FIGS. 9 to 12 show the unlocking and locking of the free pivoting device. FIG. 9 shows the locked state of the operating position. The pawl 80 has dropped, i.e. the locking cam 80a is supported on the locking surface 140b. A spring 92, which is active between the blocking cam 90 and the third fitting part 74, acts upon the blocking cam 90 with a torque in the direction of an abutment against the pawl 80 (anticlockwise in FIG. 9). The pawl 80, as a result, is held in its locked position under normal operating loads. The third pivot point D3 lies on an imaginary connecting line L between the second pivot point D2 and the fourth pivot point D4 or (depending on the tolerance position) or slightly between the connecting line L and the pawl 80. The blocking cam 90 and the coupler 98 are aligned almost in a line as a result. The cam 90 is supported at the side on the pawl 80 such that the third pivot point D3 is not able to move further in the direction of the pawl 80. The four-pivot chain is situated as a result in a blocked (dead center) position; even high crash forces acting on the pawl 80 cannot open the pawl 80 on account of the straight part of the blocking cam 90 and the coupler 98 and the support of the cam 90 on the pawl 80. In the case of a realization of the third pivot point D3 as a turn-slide joint, in the event of a crash the small, delimited translation path in the joint is run through until the stub axle 90a abuts against an edge of the elongated hole of the coupler 98.

Figure 10:
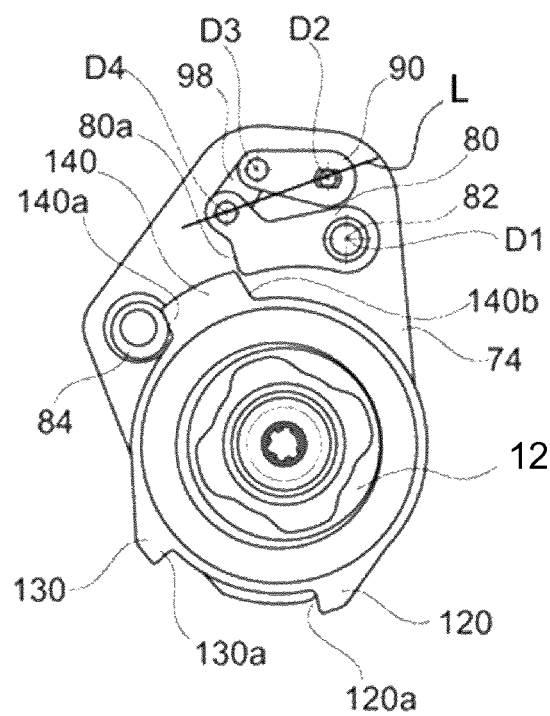
FIG. 10 is a view corresponding to FIG. 9 during the unlocking of the free pivoting device.

FIG. 10 shows the fitting 10 during the unlocking of the free pivoting function. As a result of actuating the manual lever 8, the blocking cam 90 (clockwise in FIG. 10) is pivoted away from the pawl 80 in opposition to the force of the spring 92. The third pivot point D3 is moved onto the side of the connecting line L remote from the pawl 80. The blocking cam 90 pulls the pawl 80 out of the locked position by means of the coupler 98 such that the locking cam 80a of the pawl 80 no longer abuts against the locking surface 140b and the third fitting part 74 including the backrest 4 is movable in the free pivoting direction. The backrest 4 can be freely pivoted. If the third pivot point—as described beforehand—lies between the connecting line L and the pawl 80 in the locked state of the free pivoting device, the realization of the third pivot point D3 as a turn-slide joint enables it to exceed the straight part, that is the connecting line L during the unlocking operation. In a modified realization, one of the other pivot points D1, D2, D4 is realized as the turn-slide joint instead of the third pivot point D3. The rest of the pivot points D1, D2, D3, D4 are realized as pure rotary joints.

Figure 11:
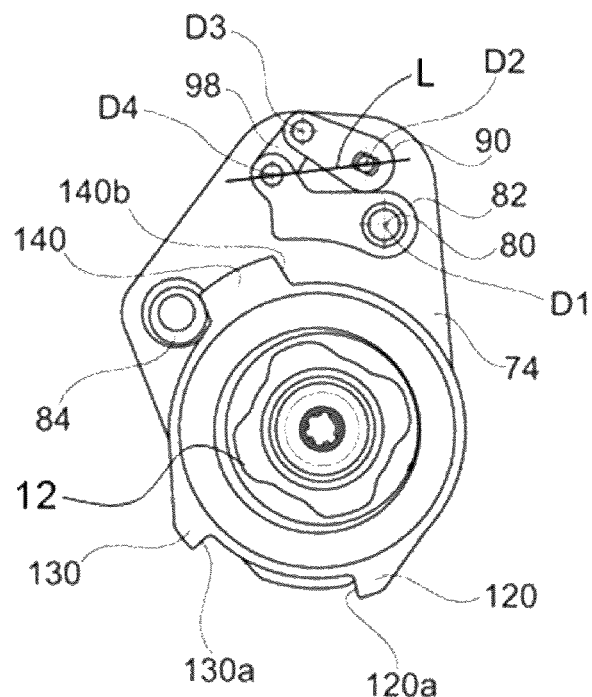
FIG. 11 is a view corresponding to FIG. 9 of the completely unlocked free pivoting device.

In order to enable secure unlocking of the free pivoting function under all tolerance conditions, the pawl 80 can be pivoted a little further into the opening direction, as can be seen from FIG. 11.

Figure 12:
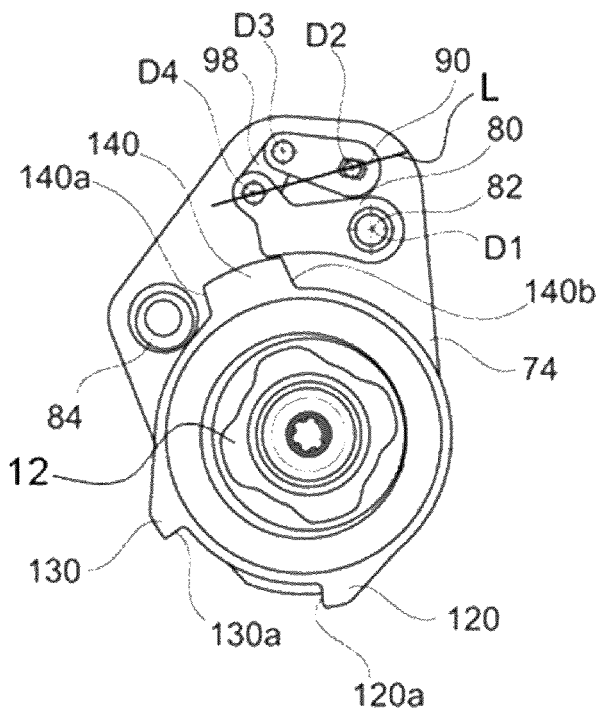
FIG. 12 is a view corresponding to FIG. 9 of the unlocked free pivoting device during the free pivoting of the backrest.

During the free pivoting operation shown in FIG. 12, the locking cam 80a of the pawl 80 lies on the radially outer delimitation of the projection 140 and slides along the same. The manual lever 8 can consequently remain non-actuated even after a small free pivoting angle. The pivoting back and locking of the third fitting part 74 and consequently of the backrest 4 is effected in the reverse order.

A retention spring 86 shown in FIG. 5 and fastened on the bearing bolt 82 abuts with one spring arm 86a against the projection 140 prestressed in the axial direction. If the third fitting part 74 is pivoted a good way forward, the spring arm 86a leaves the projection 140 and is resilient in the direction of the pawl 80 which, as a result, is prevented from dropping behind the support surface 140a.

Figure 4:
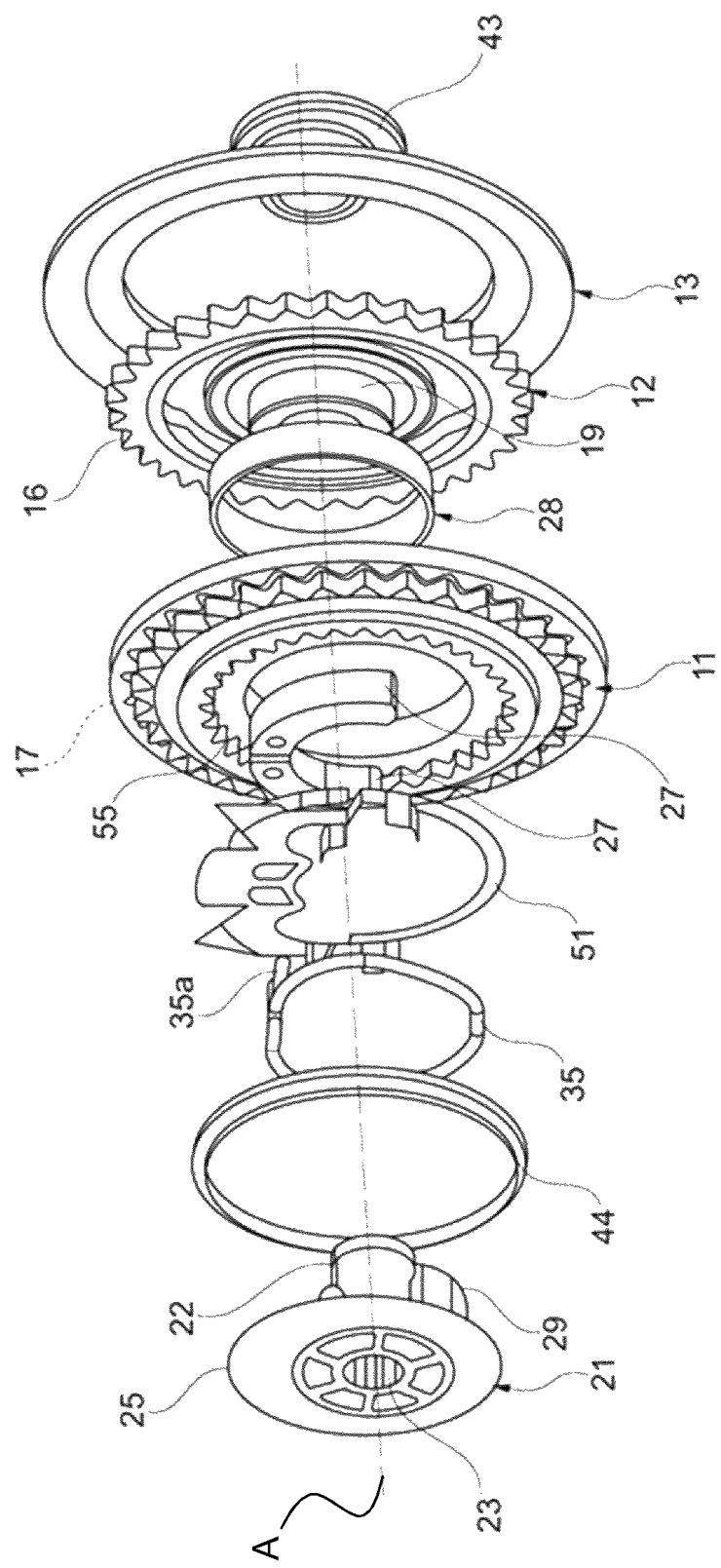
FIG. 4 is an exploded drawing of the disk-shaped unit of the fitting from FIG. 3 for adjusting the backrest inclination within a comfort adjustment range, with a first fitting part shown in a simplified manner.

According to the invention, the projection 140 is integrally molded on the first fitting part 11, i.e. it forms a one-piece component part of the same as one material entity and is not a separately produced, subsequently fastened component. The first cam 120 and the second cam 130 are also preferably integrally molded on the first fitting part 11 (or on the clamping ring 13 or on the bearing ring 71). The solution according to the invention is promoted by a clamping ring 13 with a substantially flat form, as shown in FIGS. 4 and 6, which engages over the first fitting part 11 at best in places and thus enables radially protruding material parts also on the edge of the first fitting part 11.

Different realizations for the projection 140 and the pawl 80 are possible. In a modified realization, the pawl 80 can comprises several teeth which interact with several tooth gaps in the projection 140.

A modification of the exemplary embodiment is shown in FIGS. 13 to 16. Said modified exemplary embodiment corresponds in design and in the method of operation to the previously described exemplary embodiment with the exception of the additional features and operating sequences described below.

The coupler 98 comprises a first support means which is realized in the present case as a coupler lug 98a. In principle, however, first support means which are realized in another manner are also conceivable, in particular journals or other additional geometries which are integral with or added to the coupler 98.

The coupler lug 98a is realized integrally with the coupler 98. The fourth pivot point D4 is situated between the third pivot point D3 and the coupler lug 98a; the fourth pivot point D4, in this case, does not have to be located on an imaginary connecting line between the third pivot point D3 and the coupler lug 98a.

A second support means is fixedly connected to the third fitting part 74. In the present case, the second support means is realized as a support cam 75. In principle, however, second support means which are realized in another manner are also conceivable, in particular journals or other additional geometries which are integral with or added to the third fitting part 74.

Figure 13:
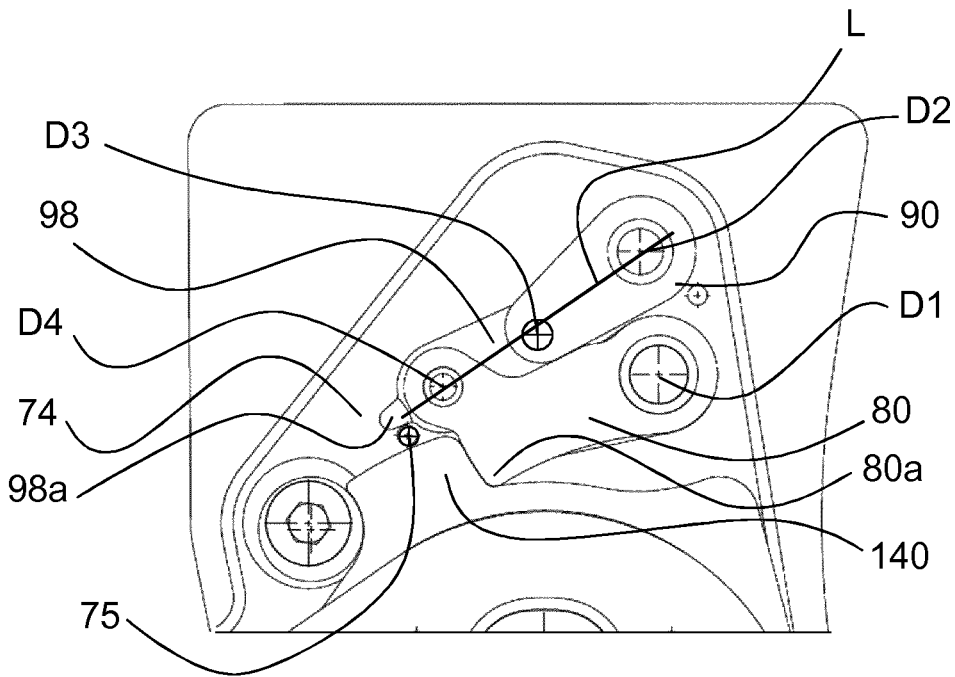
FIG. 13 is a view of a detail corresponding to FIG. 9 of a modification of the first exemplary embodiment in the locked state.

In an analogous manner to FIG. 9, FIG. 13 shows the locked state of the operating position. The pawl 80 has dropped. The coupler lug 98a abuts against the support cam 75. However, the action according to the invention described below also occurs when there is some air between the coupler lug 98a and the support cam 75 in the operating position such that they do not abut against one another.

Figure 14:
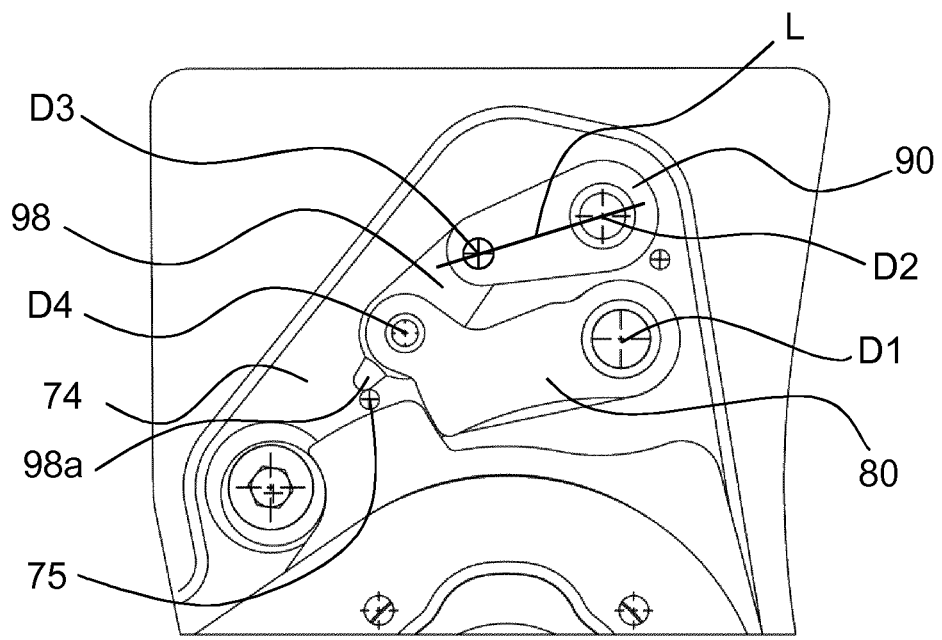
FIG. 14 is a view corresponding to FIG. 10 of the modification of the first exemplary embodiment during the unlocking of the free pivoting device.

FIG. 14 shows the fitting 10 during the unlocking of the free pivoting function. The blocking cam 90 is pivoted away from the pawl 80 as described previously (clockwise in FIG. 14). On account of the third pivot point D3 between the blocking cam 90 and the coupler 98, the coupler 98 is also pivoted (anticlockwise in FIG. 14). In this case, the coupler lug 98a of the coupler 98 is supported on the support cam 75 of the third fitting part 74. As the movement sequence continues, the support point between the coupler lug 98a and the support cam initially forms an instantaneous center of rotation about which the coupler 98 moves (anticlockwise). As a result of the fourth pivot point D4 being located between the third pivot point D3 and the coupler lug 98a, the fourth pivot point D4 pulls the pawl 80 out of its locked position.

The distance between the third pivot point D3 and the fourth pivot point D4 is greater than the distance between the support point (between the coupler lug 98a and the support cam 75) and the third pivot point D3. As a result, a simple lever gear is defined where the force onto the fourth pivot point D4 and consequently the force acting on the pawl 80 so as to open it is amplified, in the present case by approximately the factor 3. Adhesive friction between the pawl 80 and the projection 140 can be better overcome as a result.

The lever effect described beforehand supports the movement sequence of the four-pivot chain 74, 80, 98, 90. The four-pivot chain 74, 80, 98, 90 has a degree of freedom of the gear of 1. The coupler lug 98a is designed such that, along with a rotational movement about the support cam 75, it can slide additionally along said support cam so that the movement of the four-pivot chain 74, 80, 98, 90 is not blocked.

Figure 15:
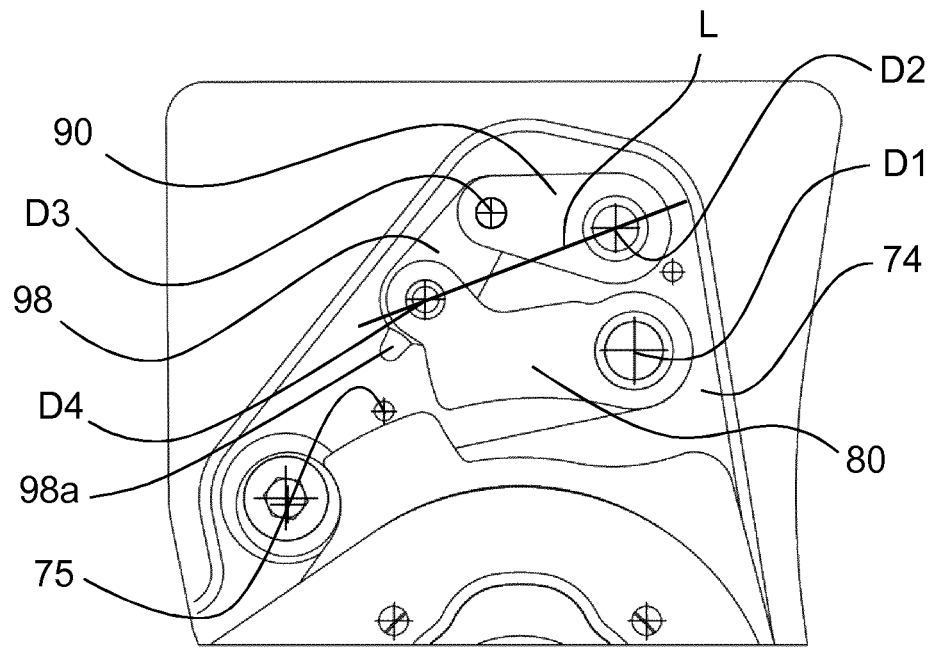
FIG. 15 is a view corresponding to FIG. 11 of the modification of the exemplary embodiment with the free pivoting device fully unlocked.
Figure 16:
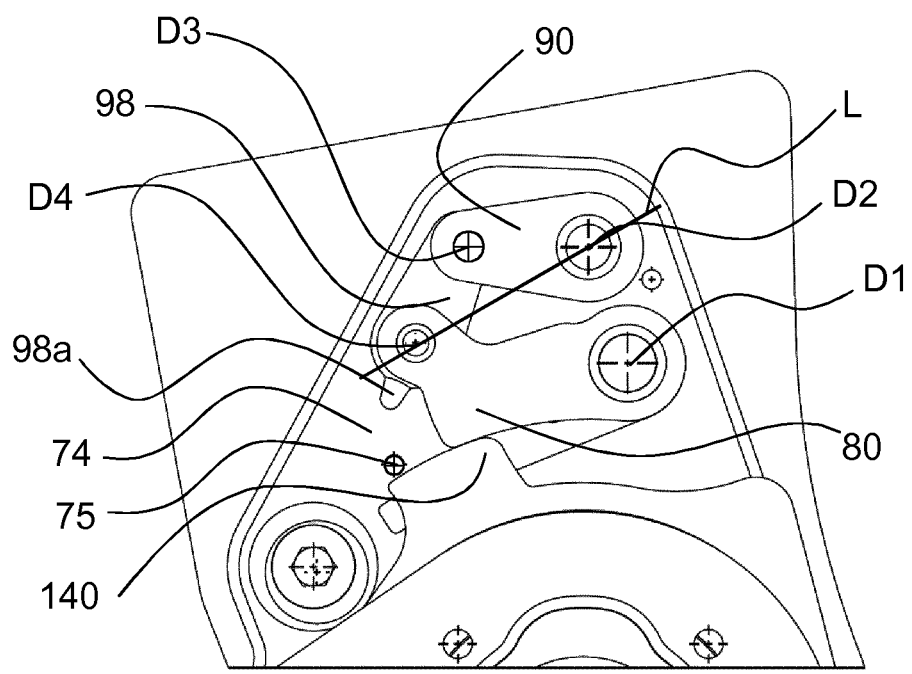
FIG. 16 is a view corresponding to FIG. 12 of the modification of the exemplary embodiment during the free pivoting of the backrest.

As the movement sequence continues to an open position of the pawl 80 shown in FIG. 15, the coupler lug 98a is released from the support cam 75.

By way of the fitting 10 shown in FIGS. 17 to 21 with a locked free pivoting device, the assembly of the fitting 10 is explained below with regard to the play-free position of the free pivoting device.

Figure 17:
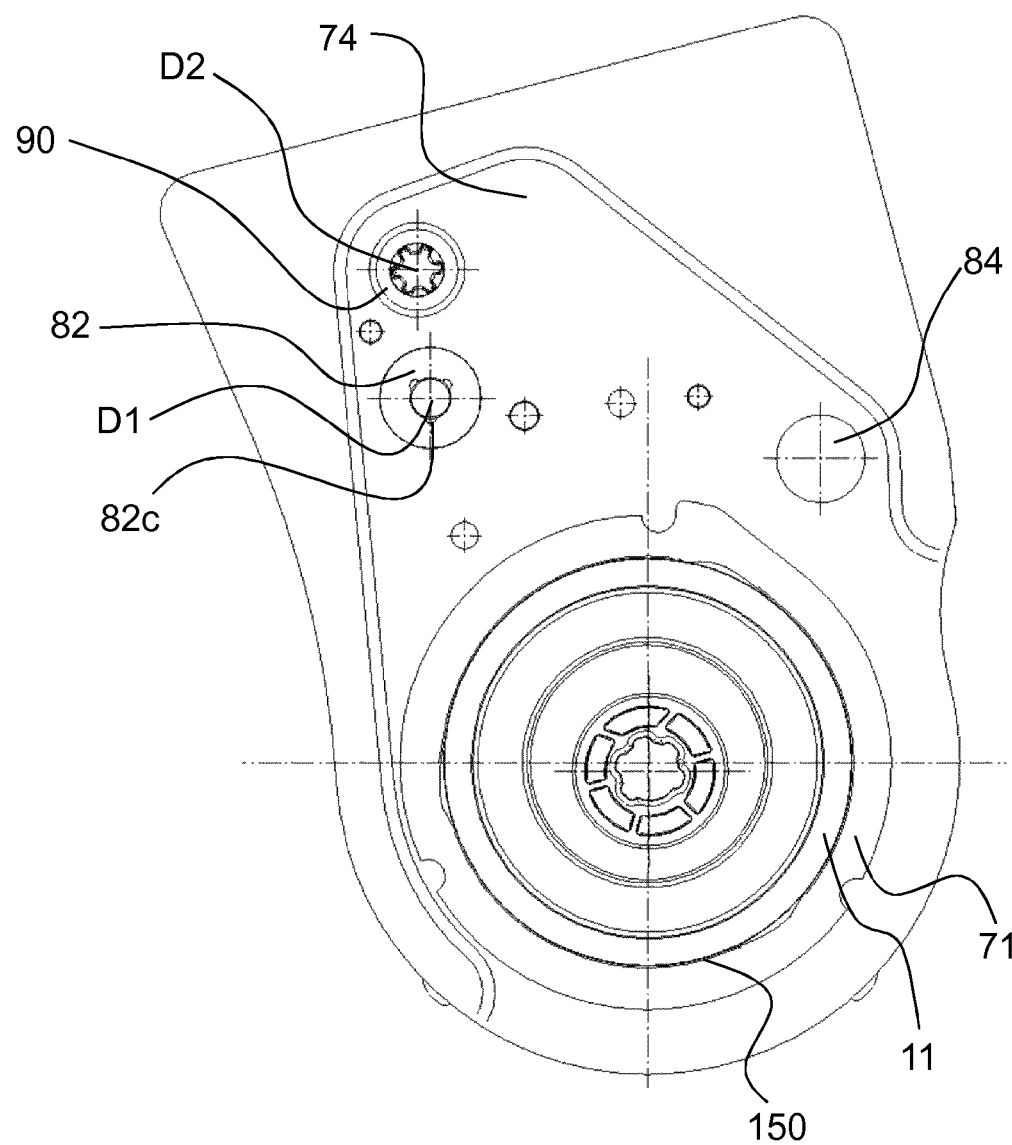
FIG. 17 is a top view of the fitting from FIG. 13 in a direction of view opposite that of FIG. 13.
Figure 18:
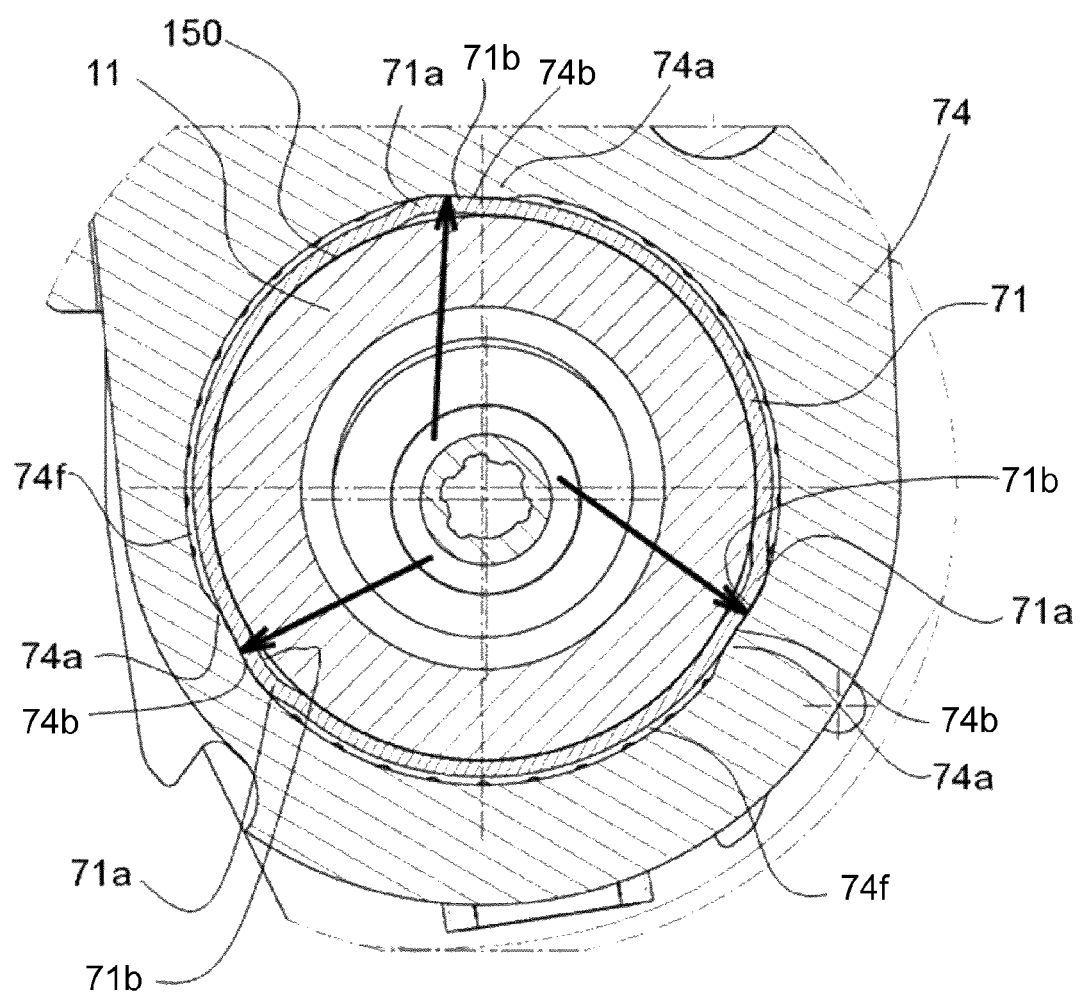
FIG. 18 is a sectional representation of a view of a detail of the bearing position between the bearing ring and the third fitting part, the section plane extending perpendicularly to an axial extension of the fitting through the bearing ring.
Figure 19:
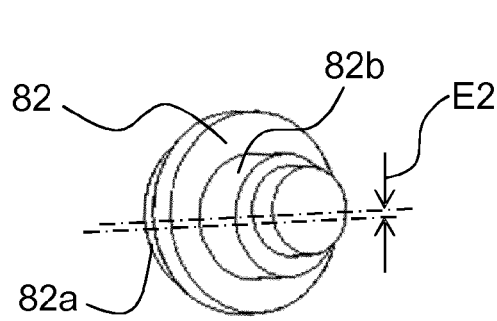
FIG. 19 is a perspective view of a bearing bolt which is suitable for all the exemplary embodiments.
Figure 20:
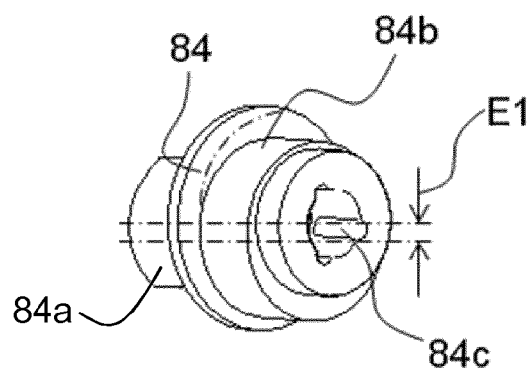
FIG. 20 is a perspective view of an eccentric bolt which is suitable for all the exemplary embodiments.

FIG. 17 shows a top view of a fully assembled fitting 10 with the direction of view onto the bearing ring 71. FIG. 18 shows a sectional representation corresponding to FIG. 17, the section plane extending perpendicularly to the axis A through the bearing ring 71 such that in particular the first run-up surfaces 71b and the second run-up surfaces 74b can be seen.

Figure 21:
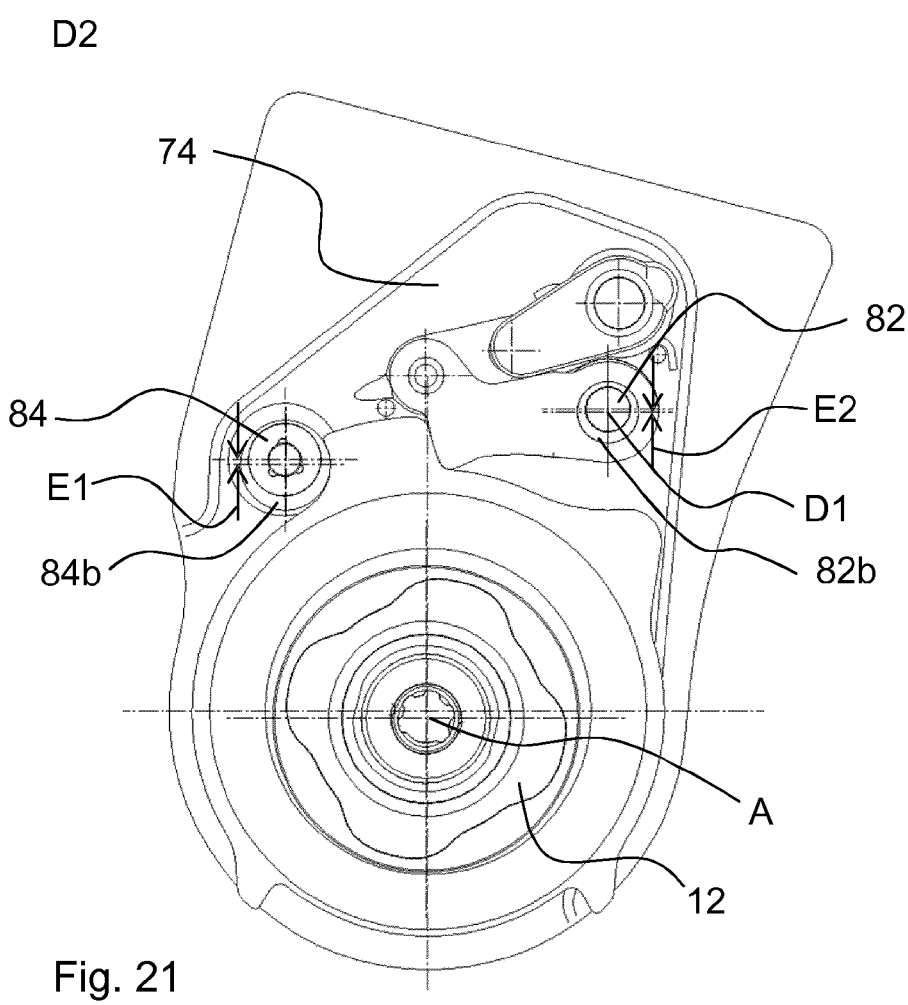
FIG. 21 is a view corresponding to FIG. 13 having a bearing bolt which is shown in FIG. 19 and an eccentric bolt which is shown in FIG. 20.
Figure 22:
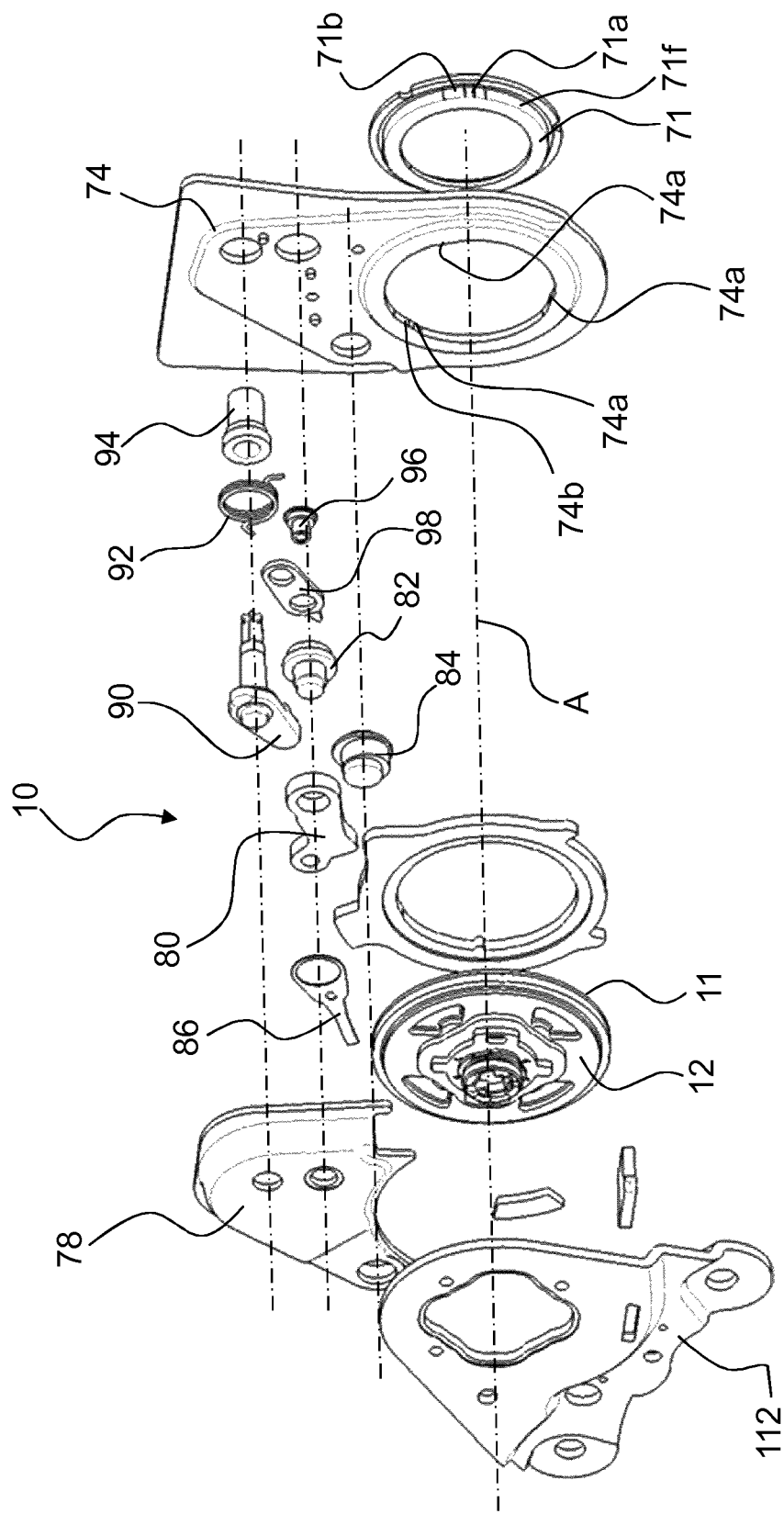
FIG. 22 is a schematic exploded drawing of a second exemplary embodiment with a disk-shaped unit which is realized as a latching fitting.

FIG. 21 shows a top view of the locked fitting 10 from a direction of view which is opposite that of FIGS. 17 and 18.

The play-free position of the free pivoting device takes place after a pre-assembly of the individual components of the fitting 10, but prior to a final fixing of the bearing ring 71 on the first fitting part 11 and in particular prior to a final fixing of the bearing bolt 82 and of the eccentric bolt 84. For the play-free position of the free pivoting device of the fitting 10, a play-free, locked operating position of the free pivoting device is generated.

Initially, as a result of rotating the bearing ring 71, which is fitted onto a shoulder of the first fitting part 11, about the axis A, the relative position of the bearing ring 71 is adjusted relative to the first fitting part 11 and the bearing ring 71 is then fixed in said position on the first fitting part 11, preferably welded by means of a weld seam 150, for example a laser weld seam 150.

To this end, initially the relative position between the first fitting part 11 and the third fitting part 74, which corresponds to a locked free pivoting device, is pre-adjusted in an approximately correct manner. The bearing ring 71 is then rotated relative to the third fitting part 74 about the axis A until the run-up surfaces 71b of the run-up cams 71a and the run-up surfaces 74b of the elevations 74a abut against one another in a play-free manner. The bearing ring 71 is then welded with the first fitting part 11 in said position.

In a further assembly step, the eccentric bolt 84 is adjusted and fixed, preferably welded with the third fitting part 74. To this end, the eccentric bolt 84 is rotated about the first bolt portion 84a which is inserted into the third fitting part 74 such that the center point of the eccentric second bolt portion 84b, which can be moved into abutment with the support surface 140a, is moved along a circular path, the radius of which corresponds to a first eccentricity E1. The eccentric bolt 84 is rotated in relation to the third fitting part 74 until it abuts in a play-free manner against the locking cam 80a of the pawl 80. The eccentric bolt 84 is then fixed on the third fitting part 74, in particular is welded to the same.

To compensate for production tolerances, the bearing bolt 82 can also be formed additionally in a correspondingly eccentrically stepped manner, that means it can comprise a second eccentricity E2. A first bearing bolt portion 82a of the bearing bolt 82, which is inserted into a circular hole of the third fitting part 74 and is formed in a circular-cylindrical manner, then has a center axis which is offset radially to a parallel center axis, which defines the first pivot point D1, of a second bearing bolt portion 82b which serves for the bearing arrangement of the pawl 80. As a result, the second eccentricity E2 of the bearing bolt 82 is defined. When the bearing bolt 82 is rotated about the first bearing bolt portion 82a inserted into the third fitting part 74, the first pivot point D1 is moved along a circular path, the radius of which corresponds to the second eccentricity E2. When the fitting is assembled, the bearing bolt 82 is rotated in relation to the third fitting part 74 until the first pivot point D1 has reached its optimum position and the pawl 80 engages the locking surface 140b of the projection 140 in a play-free manner by means of maximum engagement of the locking cam 80a, however outside the angular range of the self-locking system. An inside profile 82c, for example a hexagon socket or another inside profile in the bearing bolt 82 serves at the same time as an interface to a twisting tool with a complementary geometry, for example a hexagon key. The bearing bolt 82 is then fixed on the third fitting part 74, in particular is welded to the same.

FIG. 22 shows a second exemplary embodiment of a fitting 10, the fitting parts of which 11 and 12 operate according to the principle of a latching fitting which is known per se, the operating principle of which with regard to locking between the first fitting part 11 and the second fitting part 22 is known, for example, from DE 10 2008 024

853 A1. The remaining components correspond to the previously described components of the first exemplary embodiment and its modification. The previously described operating sequences and method steps during the assembly are transferable in an identical manner to the second exemplary embodiment.

The various developments of the features disclosed in the preceding description, the claims and the drawings can be important both individually and in combination to the realization of the invention.

While specific embodiments of the invention have been shown and described in detail to illustrate the application of the principles of the invention, it will be understood that the invention may be embodied otherwise without departing from such principles.

The invention claimed is:

1. A fitting for a vehicle seat, the fitting comprising:
    a first fitting part;
    a second fitting part rotatable relative to the first fitting part and in geared connection with the first fitting part, or lockable with the first fitting part;
    a bearing ring fastened on the first fitting part;
    a third fitting part which is mounted on the bearing ring so as to be pivotable about an axis relative to the first fitting part; and
    a pawl mounted in a first pivot point on the third fitting part, wherein the third fitting part is lockable with the first fitting part, or with a component which is fixedly connected to the first fitting part, by means of the pawl and the bearing ring comprises several run-up cams which interact with several elevations of the third fitting part in such a manner that with the pawl locked, free play in the radial direction between the bearing ring and the third fitting part is minimized.

2. The fitting as claimed in claim 1, wherein the bearing ring comprises three run-up cams and the third fitting part comprises three elevations.

3. The fitting as claimed in claim 1, further comprising an eccentric bolt fastened on the third fitting part and with the pawl in the locked state, the eccentric bolt abuts against a projection of the first fitting in a play free manner.

4. The fitting as claimed in claim 3, wherein the eccentric bolt includes a bolt portion which extends parallel to the axis and is inserted into an opening of the third fitting part, and includes a second bolt portion which extends parallel to the axis and, with the pawl in the locked state, abuts in a play-free manner against the projection, and the first bolt portion and the second bold portion are arranged offset with respect to one another in the radial direction about a first eccentricity.

5. The fitting as claimed in claim 4, wherein the first pivot point is formed by a bearing bolt and the bearing bolt includes a first bearing bolt portion which extends parallel to the axis and is inserted into an opening of the third fitting part, and includes a second bearing bolt portion which extends parallel to the axis and bears the pawl, and the first bearing bolt portion and the second bearing bolt portion are arranged offset with respect to one another in the radial direction about a second eccentricity.

6. The fitting as claimed in claim 1, further comprising a coupler and a blocking cam which is mounted in a second pivot point on the third fitting part, wherein the third fitting part, the blocking cam, the coupler, which is flexibly connected to the blocking cam in a third pivot point and to the pawl in a fourth pivot point, and the pawl define a four-pivot linkage.

7. The fitting as claimed in claim 6, wherein at least one of the pivot points of the four-pivot linkage is realized as a turn-slide pivot joint and the remaining pivot points are realized as rotary pivot joints.

8. The fitting as claimed in claim 6, wherein a spring pre-stresses the four-pivot linkage in the direction of the locked position of the pawl.

9. The fitting as claimed in claim 6, wherein with the pawl in the locked state, the third pivot point lies on an imaginary connecting line which runs between the second pivot point and the fourth pivot point, and during the unlocking operation of the pawl the third pivot point is moved by means of the four-pivot linkage onto a side of the connecting line which is remote from the pawl.

10. The fitting as claimed in claim 6, wherein with the pawl in the locked state, the third pivot point lies between an imaginary connecting line, which runs between the second pivot point and the fourth pivot point, and the pawl, and during the unlocking operation of the pawl the third pivot point is moved by means of the four-pivot linkage onto the side of the connecting line which is remote from the pawl.

11. A method for assembling a fitting comprising a first fitting part, a second fitting part rotatable relative to the first fitting part and in geared connection with the first fitting part or lockable with the first fitting part, a bearing ring fastened on the first fitting part, a third fitting part which is mounted on the bearing ring so as to be pivotable about an axis relative to the first fitting part and a pawl mounted in a first pivot point on the third fitting part, wherein the third fitting part is lockable with the first fitting part, or with a component which is fixedly connected to the first fitting part, by means of the pawl and the bearing ring comprises several run-up cams which interact with several elevations of the third fitting part in such a manner that with the pawl locked, free play in the radial direction between the bearing ring and the third fitting part is minimized, said method comprising the steps of:
    pre-positioning the first fitting part, the third fitting part and the bearing ring into a relative position with respect to one another, which at least approximately corresponds to a locked position of the pawl;
    rotating the bearing ring about the axis relative to the third fitting part until the run-up cams and the elevations abut against one another in a play-free manner; and
    fixing the bearing ring on the first fitting part.

12. The method as claimed in claim 11, wherein the bearing ring is fixed on the first fitting part via laser welding.

13. The method as claimed in claim 11, wherein in a further method step an eccentric bolt is rotated until the eccentric bolt abuts in a play-free manner against a projection of the first fitting part or of a component which is connected to the first fitting part and the eccentric bolt is then fixed in said position on the third fitting part.

14. The method as claimed in claim 11, wherein the first pivot point is formed by a bearing bolt and the bearing bolt includes a first bearing bolt portion which extends parallel to the axis and is inserted into an opening of the third fitting part, and a second bearing bolt portion which extends parallel to the axis and bears the pawl, and the bearing bolt is rotated until the pawl abuts in a play-free manner against a projection and the bearing bolt is then fixed in said position on the third fitting part.

15. A vehicle seat comprising:
    a seat part;
    a backrest; and
    a fitting comprising:
    a first fitting part;

a second fitting part rotatable relative to the first fitting part and in geared connection with the first fitting part, or lockable with the first fitting part;
a bearing ring fastened on the first fitting part;
a third fitting part which is mounted on the bearing ring so as to be pivotable about an axis relative to the first fitting part; and
a pawl mounted in a first pivot point on the third fitting part, wherein the third fitting part is lockable with the first fitting part, or with a component which is fixedly connected to the first fitting part, by means of the pawl and the bearing ring comprises several run-up cams which interact with several elevations of the third fitting part in such a manner that with the pawl locked, free play in the radial direction between the bearing ring and the third fitting part is minimized, wherein the backrest and the seat part are connected together by means of the fitting.

16. The vehicle seat as claimed in claim 15, wherein the bearing ring comprises three run-up cams and the third fitting part comprises three elevations.

17. The vehicle seat as claimed in claim 15, further comprising an eccentric bolt fastened on the third fitting part and with the pawl in the locked state, the eccentric bolt abuts against a projection of the first fitting in a play free manner.

18. The vehicle seat as claimed in claim 17, wherein the eccentric bolt includes a bolt portion which extends parallel to the axis and is inserted into an opening of the third fitting part, and includes a second bolt portion which extends parallel to the axis and, with the pawl in the locked state, abuts in a play-free manner against the projection, and the first bolt portion and the second bold portion are arranged offset with respect to one another in the radial direction about a first eccentricity.

19. The vehicle seat as claimed in claim 18, wherein the first pivot point is formed by a bearing bolt and the bearing bolt includes a first bearing bolt portion which extends parallel to the axis and is inserted into an opening of the third fitting part, and includes a second bearing bolt portion which extends parallel to the axis and bears the pawl, and the first bearing bolt portion and the second bearing bolt portion are arranged offset with respect to one another in the radial direction about a second eccentricity.

20. The vehicle seat as claimed in claim 15, further comprising a coupler and a blocking cam, which is mounted in a second pivot point on the third fitting part, wherein the third fitting part, the blocking cam, the coupler, which is flexibly connected to the blocking cam in a third pivot point and to the pawl in a fourth pivot point, and the pawl define a four-pivot linkage.

* * * * *